COMBINED REEL AND CANISTER

Filed Oct. 23, 1965

INVENTORS
RODNEY BARCLAY
RAYMOND C. VON FELTEN
BY Naylor & Neal
ATTORNEYS

United States Patent Office 3,341,001
Patented Sept. 12, 1967

3,341,001
COMBINED REEL AND CANISTER
Rodney Barclay, Cambell, and Raymond C. von Felten, Saratoga, Calif., assignors to Memorex Corporation, a corporation of California
Filed Oct. 23, 1965, Ser. No. 503,086
4 Claims. (Cl. 206—52)

ABSTRACT OF THE DISCLOSURE

Combined reel and canister with peripheral dust seal, gripping flange and latch mechanism between the reel and canister.

This invention relates to storage devices for magnetic tapes, photographic films, and the like, and more particularly to a combined reel and canister for magnetic computer tape.

Magnetic tapes for computers are generally wound on conventional reels which are stored in canisters. The reels are subject to precision requirements as to their dimensions and moment of inertia in order that the reels will operate satisfactorily on high speed computers, and the canisters are subject to stringent requirements in order that they will withstand normal wear and tear and in order that they will protect the magnetic tapes from dust and dirt which can seriously damage the tape during use of the tape on the computer.

In accordance with this invention there is provided a combined reel and canister for storage of magnetic computer tapes and the like where the reel is compatible with computers now in use and where the canister satisfies all of the stringent requirements imposed on the canister. The combined reels and canisters of this invention may be used much more efficiently than reels and canisters known heretofore. The canister involves a single piece which becomes separated from the reel during use and hence provides one instead of two pieces which must be handled separately from the reel. The reel and canister fit together in a novel way which permits the reel to be mounted on the reel support of a computer prior to the time that the canister is removed from the reel; in this way, the handling of tape reels during mounting of the reel on the computer and removal of the reel from the computer is accelerated substantially.

Other features and advantages of the invention will become apparent from the following description read in conjunction with the attached drawing in which.

Figures 1, 2, 3:
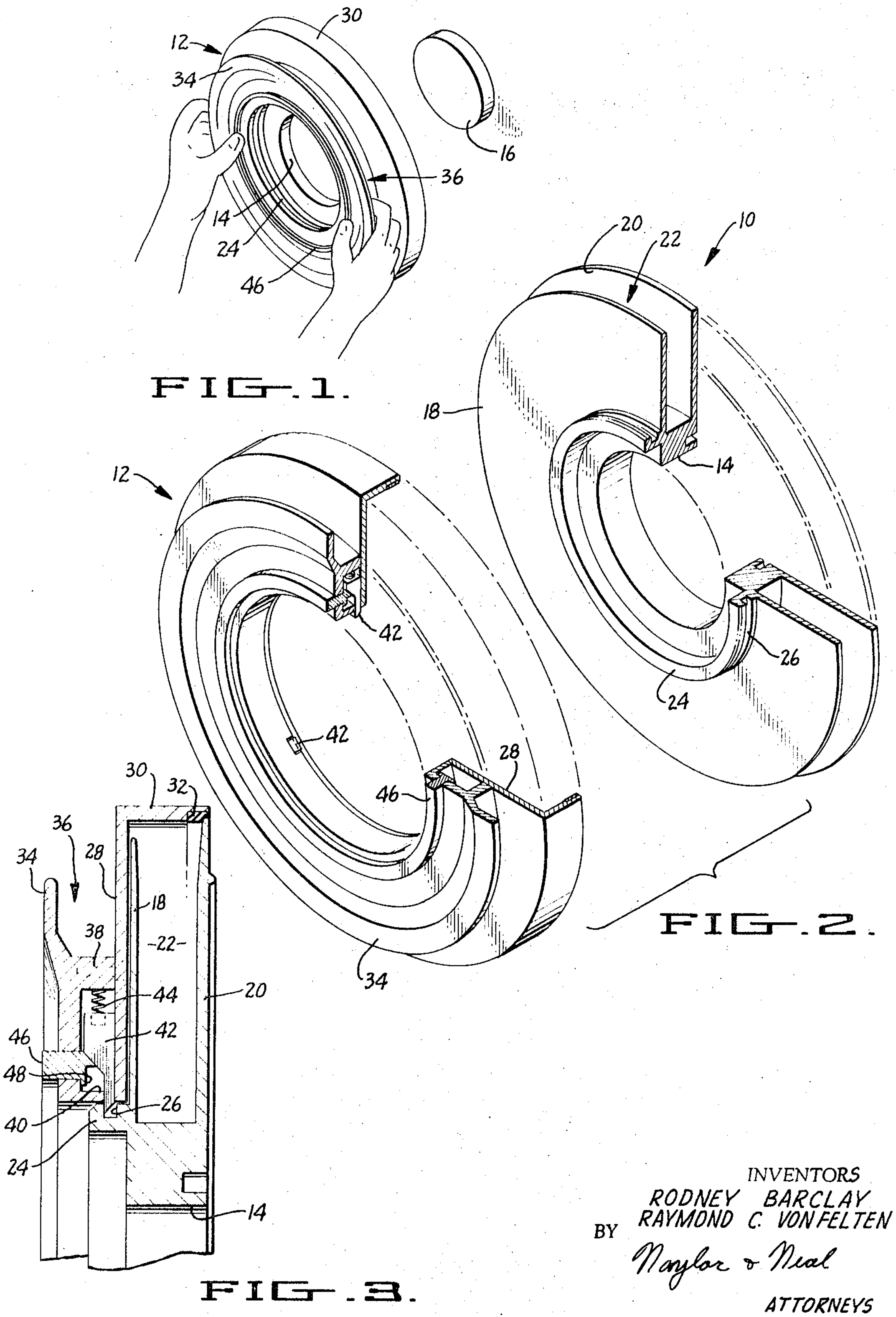
FIG. 1 is a perspective view of a combined reel and canister of this invention being mounted upon the reel support of a computer.
FIG. 2 is an exploded view, partially in section of the combined reel and canister of FIG. 1.
FIG. 3 is a cross-sectional view on an enlarged scale of a portion of the apparatus illustrated in FIG. 2.

Referring now in detail to the drawings, the combined reel and canister illustrated therein includes a reel 10 and a cover 12 which are mounted together as explained in detail hereinafter. The reel has a central hub 14 which is adapted to receive the cylindrical hub 16 of a reel support. Generally the hub 16 takes the form of a rubber sleeve accompanied by suitable mechanism for compressing the sleeve axially to force the sleeve to expand radially into firm gripping engagement with the interior of the hub 14.

The reel 10 has a first flange 18 and a second flange 20 extending radially therefrom and bounding there between a tape winding space 22. For reasons explained hereinafter, and as illustrated in FIG. 3, the first flange 18 is shorter than the second flange 20, that is the second flange 20 extends to a greater distance from the axis of rotation of the reel than does the flange 18. The hub of the reel 10 is provided with an axially facing flange 24 adjacent to the flange 18 with an annular groove 26 in its outer surface.

The canister 12 includes a radial portion 28 which lies generally in engagement with the flange 18 with an axially extending flange 30 on its outer edge. The flange 30 is completely outside the flange 18 of the reel and extends from the flange 20 across the flange 18 and across the tape winding space 22 into engagement with the second flange 20. A gasket 32 is mounted on the flange 30 as illustrated in FIG. 3 to provide a seal between the cover and the rear flange 20. The gasket 32 has a surface portion thereon which faces axially of the canister away from the flange 28, and it is this surface which engages the flange 20.

The cover is provided with a radially extending flange 34 separated from the radial portion 28 by a groove 36 by which the cover may be gripped as illustrated in FIG. 1 when the combined reel and canister are placed on the reel support and when the cover is removed from or replaced on the reel. The flange 34 may be integrally formed with the radial portion 28, but depending on the method desired for assembly of the latch mechanism described below, it may be desirable to form the flange 34 on a separate piece which is attached to the radial portion 28 by means of a screw 38 in FIG. 3.

The cover is provided with a cavity 40 in which are mounted three radially movable latch members 42 which protrude from the cover into the annular groove 26 in the reel and firmly latch the reel and cover together. A compression spring 44 is mounted behind each of the latch members 42 to resiliently hold the latch member in the groove 26, and the flange 24 on the reel and the ends of the latch members 42 are provided with tapered surfaces as illustrated in FIG. 3 so that the latch members will retract into the cavity 40 when the cover is pushed onto the reel.

A latch release ring 46 is mounted in the cover extending out of the cavity 40. The inner side of the ring 46 in the cavity 40 and the outer sides of the latch members 42 are provided with complementary cam surfaces which cause the latch members 42 to be withdrawn from the annular groove 26 when the latch release ring 46 is pushed into the cavity 40. A small flange 48 is provided on the ring 46 inside the cavity 40 to prevent total withdrawal of the ring 46 from the cavity.

The combined reel and canister of this invention perform very satisfactorily as a storage device for computer tape and the like. The reel 10 is compatible with the computers now on the market. The moment of inertia of the reel is slightly increased by the addition to the reel of the axially extending flange 24, but the moment of inertia is then reduced by shortening the maximum diameter of the flange 18 and making the flange 18 somewhat thinner than is conventional in computer tape reels used today. It should be noted that the flange 18 may be made much thinner than is conventional because the user of the combined reel and canister of this invention does not remove the reel from a reel support by pulling on the flange 18 as is the practice with conventional reels. As illustrated in FIG. 1, the combined reel and canister may be mounted on the reel support of a computer prior to the time that the cover 12 is removed from the reel 10. The reel support 16 is then locked to the reel 10, and the operator presses on the latch release ring 46 while pulling on the flange 34 to remove the cover 12 from the reel. In like manner, the cover 12 is replaced on the reel 10 before the reel is removed from the reel support, and after unlocking the reel support from the reel the combined reel and canister are removed.

While one specific embodiment of this invention has been illustrated and described in detail herein, it is obvious that many modifications thereof may be made without departing from the spirit and scope of the invention.

We claim:

1. A combined reel and canister comprising:

(a) a reel having a central hub adapted to be mounted on a reel support for rotation about an axis of rotation with said reel having first and second flanges extending radially from said hub and defining between them a winding space for tape and the like, (b) a cover detachably mounted on said reel adjacent to said hub on the side of said first flange opposite to said second flange with said cover having a radial portion extending radially outwardly along said first flange and having an axially extending flange on said radial portion extending across the outer edge of said first flange and across said winding space and engaging said second flange, and (c) a radially extending flange on said cover on the opposite side of said radial portion from said first flange of said reel, and a groove between said radial flange and said radial portion to permit gripping of said cover and removal of said cover from said reel when said reel is mounted on a reel support.

2. The apparatus of claim 1 characterized further by the inclusion of (a) an annular groove in the hub of said reel on the side of said first flange opposite to said second flange and facing radially outwardly, (b) a chamber in said cover between said radial portion and said radially extending flange, (c) a plurality of latch elements in said chamber extending through said cover into said annular groove, (d) spring means resiliently urging said latch members into said annular groove while permitting withdrawal of said latch members out of said annular groove and into said chamber, and (e) a latch release ring mounted on said cover extending out of said chamber in a direction away from said first flange of said reel with said ring having a cam surface thereon engaging said latch members for moving said latch members in opposition to said spring means when said ring is pushed into said chamber.

3. A magnetic storage memory comprising:

(a) a magnetic memory having a central hub adapted to be mounted upon a rotary drive support for rotation about an axis of rotation with said magnetic memory having first and second flanges extending radially from said hub and magnetic recording material between said flanges, (b) a cover detachably mounted on said memory adjacent to said hub on the side of said first flange opposite said second flange with said cover having a radial portion extending radially outwardly along said first flange and having an axially extending flange on said radial portion extending across the outer edge of said first flange and into engagement with said second flange, and (c) a radially extending flange on said cover on the opposite side of said radial portion from said first flange of said memory, and a groove between said radial flange and said radial portion to permit gripping of said cover and removal of said cover from said memory when said hub is mounted on a rotary support.

4. The apparatus of claim 3 characterized further by the inclusion of releasable latch means adjacent to said radially extending flange with said releasable latch means interconnecting said cover and said memory.

References Cited

UNITED STATES PATENTS

| | | | |
|---|---|---|---|
| 2,137,745 | 11/1938 | White | 206—52 |
| 2,866,574 | 12/1958 | Roumeliotis | 220—55 |
| 2,936,189 | 5/1960 | Pearson | 206—1.5 |
| 3,231,081 | 1/1966 | Elterman | 206—52 |

THERON E. CONDON, *Primary Examiner.*

WILLIAM T. DIXSON, Jr., *Examiner.*